United States Patent
Kawahara et al.

[11] Patent Number: 6,061,444
[45] Date of Patent: May 9, 2000

[54] ECHO CANCELER AND METHOD FOR LEARNING FOR THE SAME

[75] Inventors: Toshiro Kawahara; Toshio Miki; Tomoyuki Ohya, all of Kanagawa, Japan

[73] Assignee: NTT Mobile Communications Network, Inc., Japan

[21] Appl. No.: 08/907,174

[22] Filed: Aug. 8, 1997

Related U.S. Application Data

[63] Continuation of application No. 08/513,776, filed as application No. PCT/JP95/00865, May 2, 1995, abandoned.

[30] Foreign Application Priority Data

| May 7, 1994 | [JP] | Japan | 6-117588 |
| May 7, 1994 | [JP] | Japan | 6-117592 |
| May 7, 1994 | [JP] | Japan | 6-117593 |
| May 7, 1994 | [JP] | Japan | 6-117594 |

[51] Int. Cl.[7] ............................................. H04M 9/00
[52] U.S. Cl. .......................... 379/410; 379/406; 379/411; 708/322
[58] Field of Search ................................... 379/410, 406, 379/407, 408, 409, 411; 364/724.19

[56] References Cited

U.S. PATENT DOCUMENTS

| 4,562,312 | 12/1985 | Duttweiler . | |
| 4,571,720 | 2/1986 | Chevreau et al. . | |
| 4,582,963 | 4/1986 | Danstrom . | |
| 4,621,173 | 11/1986 | Guidoux . | |
| 4,628,156 | 12/1986 | Irvin | 379/410 |
| 4,648,111 | 3/1987 | Ito | 379/411 |
| 4,987,569 | 1/1991 | Ling et al. | 379/410 |
| 5,131,032 | 7/1992 | Esaki et al. . | |
| 5,132,963 | 7/1992 | Ungerboeck | 379/410 |
| 5,151,937 | 9/1992 | Chujo et al. | 379/410 |
| 5,204,854 | 4/1993 | Gregorian et al. | 379/406 |
| 5,305,309 | 4/1994 | Chujo et al. . | |
| 5,327,496 | 7/1994 | Russell et al. | 381/94 |
| 5,477,534 | 12/1995 | Kusano | 379/410 |
| 5,604,799 | 2/1997 | Komoda et al. . | |
| 5,696,819 | 12/1997 | Suizu et al. . | |
| 5,859,907 | 1/1999 | Kawahara et al. | 379/410 |

FOREIGN PATENT DOCUMENTS

| 0 391 715 | 10/1990 | European Pat. Off. . |
| 0 467 163 | 1/1992 | European Pat. Off. . |
| 0 498 369 | 8/1992 | European Pat. Off. . |
| 57-003441 | 1/1982 | Japan . |
| 57-3441 | 1/1982 | Japan . |
| 57-33844 | 2/1982 | Japan . |
| 58-090832 | 5/1983 | Japan . |
| 59-49027 | 3/1984 | Japan . |
| 59-070398 | 4/1984 | Japan . |
| 59-70398 | 4/1984 | Japan . |
| 59-080030 | 5/1984 | Japan . |
| 61-072419 | 4/1986 | Japan . |
| 61-081035 | 4/1986 | Japan . |

(List continued on next page.)

OTHER PUBLICATIONS

A learning method for System Identification (Jin–Ichi Nagumo), Jun. 1967.

*Primary Examiner*—Forester W. Isen
*Assistant Examiner*—Jacques Saint Surin
*Attorney, Agent, or Firm*—Brinks Hofer Gilson & Lione

[57] ABSTRACT

The present invention relates to an echo canceler for training an echo path estimation without providing a hindrance to a speech. The echo canceler of the present invention includes a pseudo noise generator for generating a certain pseudo noise. This pseudo noise is forcibly supplied to a transmission line for transmitting a far-end talker's voice. Here, in the case where the far-end talker's transmitting speech level is faint or the far-end talker is in a speechless condition, a certain correlation is established between the pseudo noise and a signal of the transmission line for transmitting the near-end talker's voice. Based on such a correlation as just mentioned, a coefficient for generating an echo replica is calculated. Therefore, a training for estimating an echo path is performed based on the pseudo noise and without depending on the far-end talker's voice, thereby generating an appropriate echo replica.

16 Claims, 7 Drawing Sheets

SECOND EMBODIMENT

FOREIGN PATENT DOCUMENTS

| | | |
|---|---|---|
| 61-71727 | 4/1986 | Japan . |
| 61-184934 | 8/1986 | Japan . |
| 62-032727 | 2/1987 | Japan . |
| 62-098727 | 5/1987 | Japan . |
| 62-116025 | 5/1987 | Japan . |
| 2-256327 | 10/1990 | Japan . |
| 3-098541 | 10/1991 | Japan . |
| 4-065922 | 3/1992 | Japan . |
| 4-120825 | 4/1992 | Japan . |
| 4-207824 | 7/1992 | Japan . |
| 4-329031 | 11/1992 | Japan . |
| 5-014246 | 1/1993 | Japan . |
| 5-083036 | 4/1993 | Japan . |
| 5-235808 | 9/1993 | Japan . |
| 5-268121 | 10/1993 | Japan . |
| 6-069834 | 3/1994 | Japan . |
| 6-338826 | 12/1994 | Japan . |

FIG.2
FIRST EMBODIMENT

FIG.3
SECOND EMBODIMENT

FIG.5 THIRD EMBODIMENT

ECHO CANCELER AND METHOD FOR LEARNING FOR THE SAME

This application is a continuation of application Ser. No. 08/513,776 filed May 9, 1996, now abandoned, which is a 357 of PCT/JP95/00865, filed May 2, 1995.

TECHNICAL FIELD

This invention relates to an echo canceler applicable to a mobile communications network and a long-distance telephone line network. Also, the invention relates to a learning method suited to be employed in such an echo canceler.

BACKGROUND ART

In a long-distance telephone line via a submarine cable or via a communication satellite, the subscriber's line, in general, connected to both ends of the line is of a two-wire circuit and its long-distance transmission portion is of a four-wire circuit in which transmission and reception are independent of each other in order to amplify a signal or for some other purposes. In the mobile communications network using a mobile telephone (or cellular phone), the subscriber's line of an analog telephone is also of a two-wire circuit and its portion from a repeater station for receiving a signal of a mobile telephone to a switch, etc. is also of a four-wire circuit. In those cases, a connection region between the two-wire and the four-wire is provided with a hybrid circuit for performing a four-wire/two-wire conversion.

The hybrid circuit is designed to match with impedance of the two-wire circuit. However, since the impedance of the subscriber's line is irregular and versatile, it is difficult to obtain always a good matching condition. For this reason, a part of signal input into an input terminal of the four-wire side of the hybrid circuit tends to leak toward an output terminal of the four-wire side. As a result, a so-called echo is generated. Although the echo level is lower than the transmitting speech level, speech quality is greatly lowered and a speech hindrance occurs in the case where echo returns to the talker with a delay. In view of the afore-mentioned status, an echo canceler is developed as effective apparatus for preventing a generation of echo.

Figure 1:
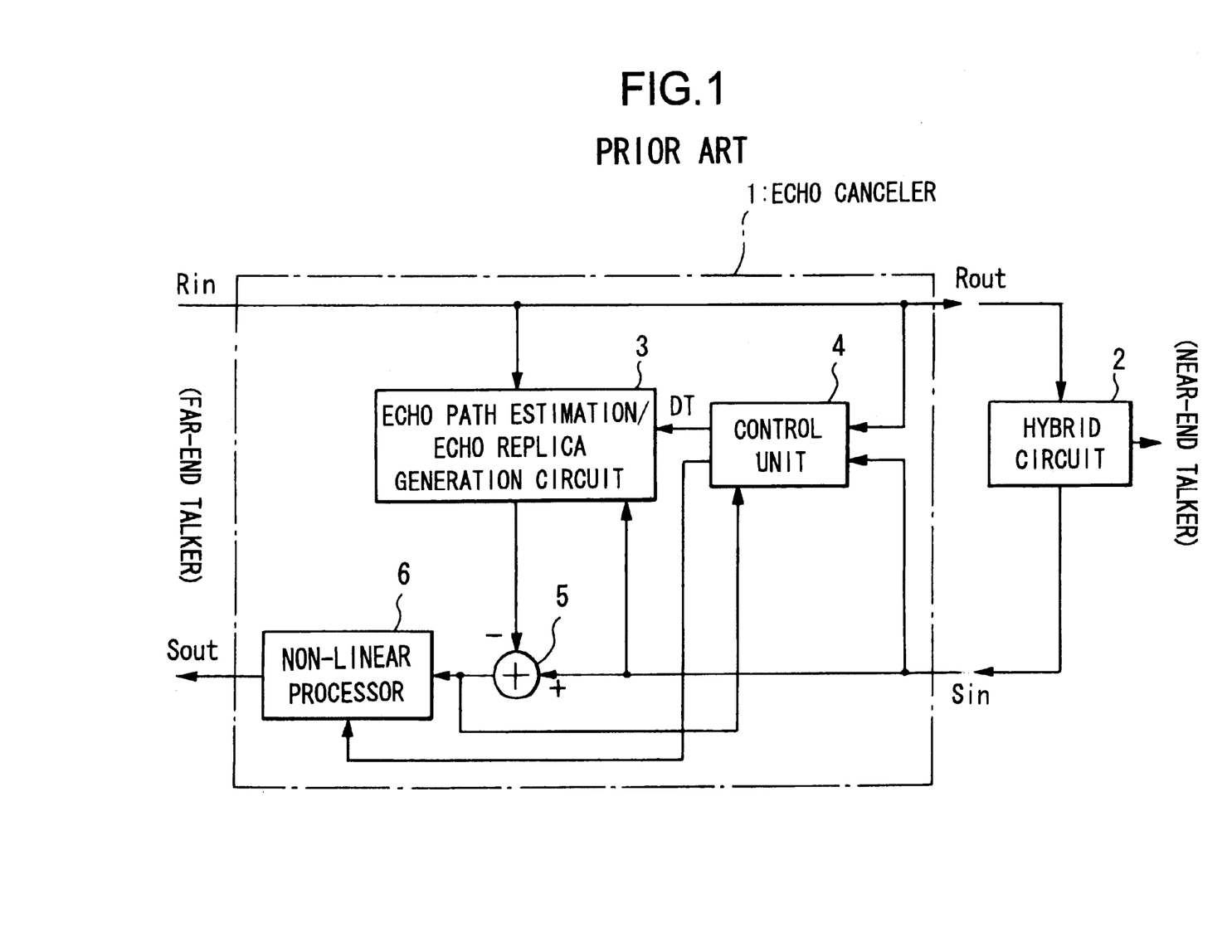
FIG. 1 is a block diagram showing a construction of a conventional echo canceler.

FIG. 1 shows a hardware block diagram of a two-wire/four-wire conversion circuit with an echo canceler. As shown in FIG. 1, the echo canceler 1 is located on a front stage of a hybrid circuit 2. The subscriber of an ordinary analog telephone is referred to as the "near-end talker" and the subscriber of a mobile telephone as the "far-end talker". A far-end voice signal input into the echo canceler 1 is represented by Rin; a far-end voice signal output from the echo canceler 1, by Rout; a near-end voice signal input into the echo canceler 1, by Sin; and a near-end voice signal output from the echo canceler 1; by Sout, respectively.

The echo canceler 1 comprises an echo path estimation circuit/echo replica generator 3, a control unit 4, an adder 5, and a non-linear processor 6. The echo path estimation circuit/echo replica generator 3 generates the same signal as an echo occurrable to the near-end voice signal Sin, using the far-end voice signal Rout. This signal is referred to as the "echo replica". This echo replica is subtracted from the near-end voice input Sin by the adder 5. The echo path estimation circuit/echo replica generator 3 makes a learning of cancellation of echo, using the output signal Rout to the hybrid circuit 2 and a residual echo which could not be canceled by the adder 5.

A digital signal is transmitted through the transmission line on the side of the far-end talker. A D/A conversion (generally, a $\mu$-LAW conversion) is made between the echo canceler 1 for processing a digital signal and the hybrid circuit 2 for making a conversion to an analog line. For this reason, the relation between the far-end voice output Rout and the near-end voice input Sin is not linear. Therefore, a mere linear computation made by the echo path estimation/echo replica generator 3 is not good enough to fully and completely cancel the echo.

Thus, a non-linear processor 6 is employed in order to cancel the residual echo which remains uncanceled. In the case where only the far-end talker is engaged in speech, the near-end voice output Sout is constituted of an echo alone. Therefore, the non-linear processor 6 makes a switching such that transmission of the near-end voice output Sout is prevented or that the near-end voice output Sout is replaced by a pseudo noise. Those operations of the non-linear processor 6 are made under the control of the controller 4. That is, the control unit 4 detects a speechless condition of the far-end talker or detects a double talk condition. Also, the control unit 4 turns on/off the learning function of the echo path estimation, detects a single talk condition of the far-end talker and further controls a switching operation of the non-linear processor 6.

Incidentally, an echo path is conventionally estimated by detecting the far-end talker's voice appearing to Sin in the form of an echo. That is, in the case where the far-end talker's voice is faint or soundless, it is impossible to detect its echo path. Therefore, in the case where the far-end talker abruptly starts talking, it is difficult for the conventional echo canceler to make a response at a good timing. The result is that an echo is transmitted to the far-end talker.

Also, as mentioned above, when the far-end is in a speechless condition or when a double talk is present, it is necessary to stop the learning. However, a timing error of detection sometimes occurs when the above detection is actually carried out. Such an error of detection timing can be one of the causes for generating a noise by mis-learning. In order to minimize the effect of the error, it is necessary to set a learning constant such that a designated value is gradually varied. However, this results in nothing other than a slow-down of learning speed.

The slow-down of a learning speed gives rise to such a problem that an echo becomes even larger immediately after the characteristic of the communication line is varied. Because the echo path is greatly varied when, in particular, a new call is set, an echo occurrable to the far-end talker's side becomes larger until the learning of the echo canceler is converged.

A speech hindrance caused by echo becomes more significant as the propagation time of signal is increased. In particular, since a speech via the satellite is greatly delayed, echo can be a big problem. Also in the case of a mobile communication using a mobile telephone, a low bit rate coding is sometimes carried out for a communication between a base station and a mobile machine or for office-to-office communication, and a lot of exchange procedures are carried out at the repeater station. Therefore, since a significant delay occurs, the echo can be a big problem.

DISCLOSURE OF INVENTION

A difficulty of the echo path estimation, in other words, a difficulty of generation of an optimum echo replica is attributable to the conventional echo canceler in which an echo path estimation is carried out based on an actual far-end taker's voice, etc. The present invention has been accomplished in view of the above-mentioned background. It is, therefore, an object of the present invention to provide an echo canceler capable of estimating an echo path irrespective of the presence of the far-end talker's voice and without creating a-significant hindrance to a speech.

In order to achieve the above object, according to a first feature of the present invention, there is provided an echo canceler employed in a communication line network including a first transmission line for transmitting a voice of a four-wire side and a second transmission line for transmitting a voice of a second-wire side, the echo canceler comprising:

pilot signal generator means for generating a pilot signal and supplying the same to the first transmission line; and coefficient calculator means for calculating a coefficient necessary for generating an echo replica based on a correlation established between the first pilot signal supplied to the first transmission line and a signal of the second transmission line.

Here, as one example of the pilot signal, there can be listed a pseudo noise or a filtered pseudo noise. The pilot signal is not particularly limited to one which is designed as a pilot signal, and a ring back tone or the like can be used for it.

In the case where a pseudo noise is selected as the pilot signal, a certain pseudo noise is supplied to a first transmission line for transmitting the far-end talker's voice and then a coefficient necessary for generating an echo replica is calculated based on a correlation established between the pseudo noise and a signal of a second transmission line. This correlation is established under the condition that the voice level of the far-end talker's can be almost neglected. The expression "such a condition that . . . can be almost neglected" used herein refers to the "time for calculating a correlation being long enough to sufficiently lower a correlation between a noise to be added and a voice on the four-wire side". In other words, a training for estimating an echo path, namely, a training for generating an echo replica can be performed irrespective of the far-end talker's voice.

It is more preferred here that the pseudo noise is subjected to filtering depending on the level or frequency characteristic of the near-end talker's voice, so that the characteristic may be varied. The reason is that even if a component of the pseudo noise is transmitted to the near-end talker through a hybrid circuit, no speech hindrance can be created. Further, since an echo replica is generated by adding a component of a pseudo noise, the component of the pseudo noise is eventually canceled and never transmitted to the far-end talker.

In the case where a ring back tone is selected as the pilot signal, a learning is carried out using this ring back tone and an echo of the ring back tone. Therefore, the learning can be converged before a call is set. As for the pilot signal, different pilot signals may be used depending on a mode of a call connection. For example, in the case where a calling is issued from the two-wire side, a ring back tone may be used as the pilot signal, and in the case where a calling is issued from the four-wire side, a training signal may be used as the pilot signal.

According to a second feature of the present invention, there is also provided an echo canceler learning method for carrying out a learning of enhancing an echo cancellation capability of an echo canceler which is adapted to cancel an echo occurred to a communication line at a real time during a communication, the echo canceler learning method comprising the steps of:

detecting a fact that a call of the communication line has been set; and setting the learning parameter in accordance with time passed after the detection.

Accordingly, for example, a learning can be carried out at a high speed immediately after the communication line is set, or at a high accuracy after the passage of a certain time. Further, instead of the learning parameter, a learning algorithm may be varied in accordance with the time passed after a call is set.

BRIEF DESCRIPTION OF DRAWINGS

FIG. 8 is a graph showing a variation of a parameter a.

BEST MODE FOR CARRYING OUT THE INVENTION

First Embodiment

Figure 2:
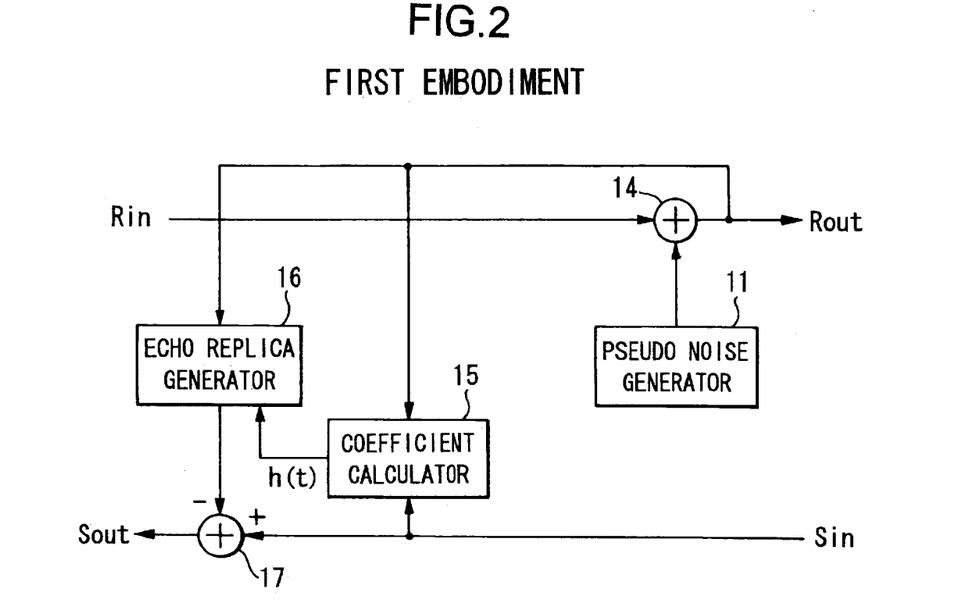
FIG. 2 is a block diagram showing an important portion of an echo canceler according to a first embodiment of the present invention.

FIG. 2 is a block diagram showing an important portion of an echo canceler according to the present invention. Here, a pseudo noise generator 11 generates a certain pseudo noise and outputs it. As this pseudo noise, a noise of a certain level (for example, white noise) is used. This pseudo noise is added to a far-end voice input Rin by an adder 14, and its result is output as a far-end voice output Rout. Therefore, a part of the pseudo noise is mixed with the near-end voice input Sin through the hybrid circuit 2 and supplied to a coefficient calculator 15.

The coefficient calculator 15 calculates a coefficient (for example, a tap coefficient such as a digital filter) necessary for generating an echo replica based on the near-end voice input Sin. In that case, a correlation established under the condition that the far-end talker's voice is faint or the far-end talker is in a speechless condition as shown by the following equation (1).

$$S(t) = \int_0^\infty h(\tau) n(t - \tau) d\tau \qquad (1)$$

In the above equation (1), t is time and t=0 is time for starting a measurement. A pseudo noise to be added to Rout is represented by n(t) and a signal to be obtained in Sin is represented by S(t). h(t) is an impulse response of an echo. Here, since n(t) is a noise which is close to white, a relation shown in the following equation (2) can be established with respect to a sufficiently large value $T_L$.

$$1/N \cdot \int_0^{T_L} n(\tau) n(t + \tau) d\tau = \delta(t) \qquad (2)$$

Here, $\delta(t)$ is a delta function and becomes 1 in case of t=0, and 0 in other cases. N is set as shown by the following equation (3).

$$N = \int_0^{T_L} n^2(\tau) d\tau \quad (3)$$

If the relation of the above equation (2) is used, ha(t), as an estimated value of h(t), can be developed in a way as shown by the following equation (4).

$$ha(t) = 1/N \cdot \int_0^{T_L} n(\tau)S(t + \tau) d\tau \quad (4)$$

$$= 1/N \cdot \int_0^{T_L} n(\tau) \cdot \int_0^{\infty} h(\tau')n(t + \tau - \tau') d\tau' d\tau$$

$$= \int_0^{\infty} h(\tau') \cdot 1/N \int_0^{T_L} n(\tau)n(t - \tau' + \tau) d\tau d\tau'$$

In the above equation (4), a portion shown by the following equation (5) becomes 1 in case of t=τ', and 0 in other cases.

$$1/N \int_0^{T_L} n(\tau)n(t - \tau' + \tau) d\tau = \delta(t - \tau') \quad (5)$$

Therefore, the equation (4) can be approximated as shown by the equation (6). Eventually, the estimated value ha(t) becomes generally equal to h(t).

$$ha(t) \approx \int_0^{\infty} h(\tau')\delta(t - \tau') d\tau' = h(t) \quad (6)$$

It should be noted that the above h(t) is an impulse response of an echo and therefore, equal to the coefficient for generating an echo replica. This can be derived from the correlation shown by the above equation (1). The coefficient calculator 15 calculates this coefficient h(t) by means of the above-mentioned calculation procedure and outputs the same to an echo replica generator 16. This echo replica generator 16 generates an echo replica based on this coefficient. The details will now be described. Firstly, it is designed such that the echo replica generator 16, as in the case with a known adaptive filter, outputs an echo replica ya, based on the following equation (7).

$$ya = ha^t x \quad \ldots (7)$$

where ha=$(h_1, h_2, \ldots h_n)^t$,
($^t$ is a transposition of a vector)
x=$(x_{k-1}, x_{k-2}, \ldots x_{k-n})^t$, $x_j$=x(jT),
(T is a sampling interval, and x(hT) is a sampling result of the far-end voice signal Rout at time jT)

In this embodiment, since the coefficients $h_1, h_2, \ldots, h_n$ are set to h(T), h(2T), . . . , h(nT), respectively, an echo component contained in the near-end voice input Sin is canceled by an adder 17. Since such an echo replica is generated by adding a pseudo noise which is mixed with the far-end voice output Rout, it can be canceled even in the event that the component of the pseudo noise is mixed with the near-end voice input Sin. As a consequence, it can be avoided that the component of the pseudo noise is transmitted to the far-end talker. Therefore, a speech hindrance occurrable to the far-end talker by the admixture of the pseudo noise is not occurred. If a noise should be somehow transmitted to the near-end talker or far-end talker by the admixture of the pseudo noise, a possible speech hindrance would be avoided by appropriately adjusting the level of the specific pseudo noise.

Second Embodiment

Figure 3:
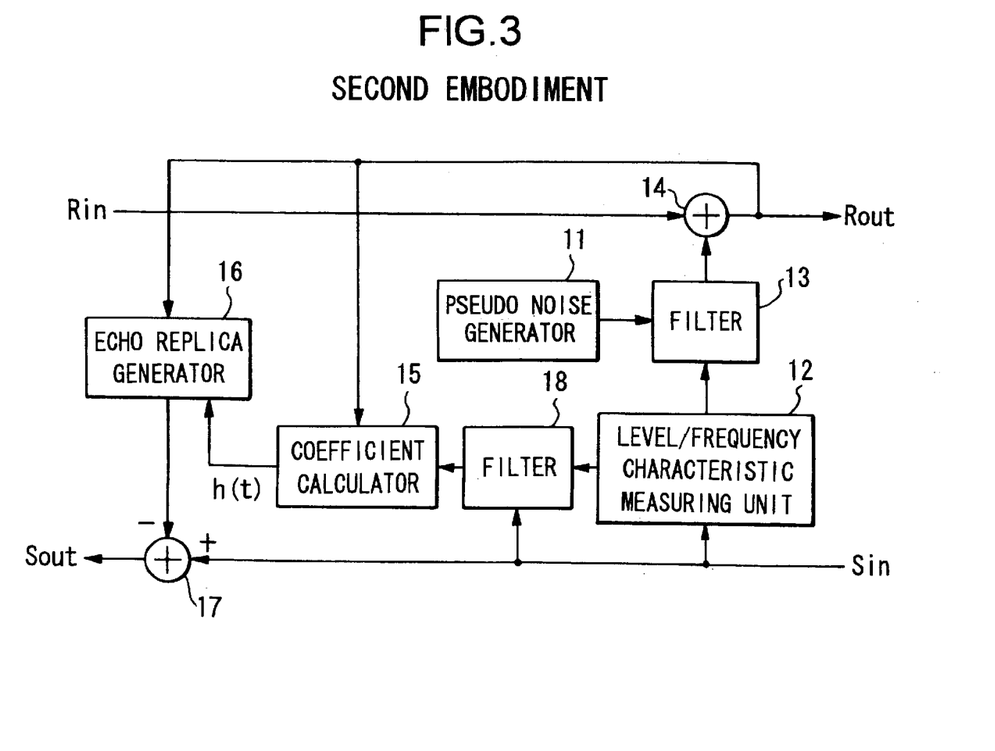
FIG. 3 is a block diagram showing an important portion of an echo canceler according to a second embodiment of the present invention.

FIG. 3 is a block diagram showing an important portion of an echo canceler according to a second embodiment of the present invention. In this embodiment, a pseudo noise generator 11, as in the case with the comparable one of the first embodiment, generates a certain pseudo noise and outputs it. On the other hand, a level/frequency characteristic measuring unit 12 measures the level and frequency characteristic of a signal of a near-end voice input Sin. Depending on a result of this measurement, characteristics of filters 13 and 18 are varied.

Figure 4:
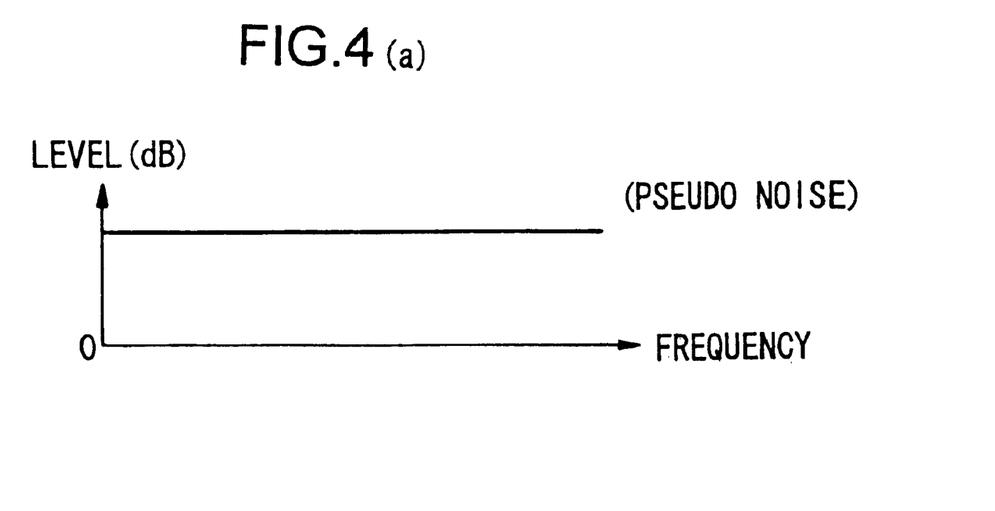
FIG. 4 is a graph showing a frequency characteristic, etc. of a filter.

FIG. 4(a) shows a frequency characteristic of the above pseudo noise. As shown in this illustration, a pseudo noise having a flat characteristic is employed. FIG. 4(b) shows a frequency characteristic of the near-end voice input Sin corresponding to the near-end talker's Voice measured by the level/frequency characteristic measuring unit 12. The characteristic of the filter 13 is varied as shown in FIG. 4(c) in accordance with the measured frequency characteristic. In this embodiment, the filter characteristic is variably set such that the frequency of the near-end talker's voice is simulated and the difference in level is fixed (in the illustrated example, 20 dB). The filter 18 is set such that it has an inverse characteristic with respect to that of the filter 13. With this feature, if the filters 13 and 18 are cascaded to each other, input and output signals of the cascaded circuit become equal to each other.

The filter 13 renders the variable filter characteristic thus set to pseudo noise and then outputs the noise. Consequently, frequency characteristic of the pseudo noise is varied in accordance with the near-end talker's voice. Since the characteristic of the pseudo noise will come to correspond to the near-end talker's voice, adverse effects, if any, to the near-end talker caused by the pseudo noise can be avoided even if such a pseudo noise is admixed with the far-end talker's voice output Rout and transmitted to the near-end talker through the hybrid circuit 2. The reason is that owing to the feature of the auditory sense, man hardly has a sense of physical disorder with respect to a signal whose frequency characteristic is approximated, and a possible deterioration in quality occurrable to a speech can be prevented from the viewpoint of man's physical sense of feel.

Also, the higher the level of the far-end talker's voice becomes, the higher the gain of the filter 18 becomes. This arrangement is made by the same reason as mentioned above. Namely, when the talk level is high, the noise can be hardly recognized by man even if the noise level is comparatively high.

An output from the filter 13 is supplied to the transmission line for transmitting the far-end talker's voice through the adder 14 and served as the fore-mentioned far-end voice output Rout. Therefore, the output from the filter 13 is partly admixed with the near-end voice input Sin through the hybrid circuit 2 and then supplied to the filter 18. Since the filter 18 has an inverse characteristic with respect to that of the filter 13, an output from the filter 18 becomes similar to a signal obtainable when a pseudo noise output from the pseudo noise generator 11 is supplied directly to the hybrid circuit 2.

Next, the coefficient calculator 15 calculates a coefficient (for example, a tap coefficient of a digital filter or the like) necessary for generating an echo replica based on the far-end voice output Rout and near-end voice input Sin. This principle will now be described in detail.

Firstly, if a noise is represented by N(f) with respect to a frequency f; characteristic of the filter 11, by G(f); characteristic of the filter 18, by $G^{-1}(f)$; and characteristic of an echo, by H(f), respectively, frequency characteristic S(f) of the near-end voice signal Sin can be given by the following equation (8).

$$S(f)=H(f)G(f)N(f) \tag{8}$$

Nextly, an output signal S'(f) of the filter 18 is given by the following equation (9).

$$\begin{aligned} S'(f) &= G^{-1}(f)S(f) \\ &= G^{-1}(f)S(f) \\ &= G^{-1}(f)H(f)G(f)N(f) \\ &= H(f)N(f) \end{aligned} \tag{9}$$

A correlation computation output between this and N(f) can be expressed by the following equation (10).

$$\begin{aligned} Ha(f) &= S'(f)N^*(f) \\ &= H(f)N(f)N^*(f) \end{aligned} \tag{10}$$

In the above equation, since N(f) is a noise close to white, the following equation (11) is approximately established.

$$N(f)N^*(f) \approx 1 \tag{11}$$

Therefore, the following equation (12) is established and an impulse response of an echo can be approximately obtained.

$$Ha(f) \approx H(f) \tag{12}$$

Therefore, in a time area, an impulse response of an echo, namely, a coefficient for generating an echo replica can be obtained from a correlation computation (the under-listed equation (13)) between an output S(t) of the filter 18 and an output n(t) of the noise generator 11.

$$ha(t) = 1/N \cdot \int_0^{T_L} S'(\tau)n(t-\tau)d\tau \tag{9}$$

where $$N = \int_0^{T_L} n^2(\tau)d\tau$$

The echo replica generator 16, as in the case with the known adaptive filter, outputs an echo replica ya based on the following equation (14) (as in the case with the equation (7) of the first embodiment).

$$ya=ha^t x \tag{14}$$

where $ha=(h_1, h_2, \ldots h_n)^t$
$x=(x_{k-1}, x_{k-2}, \ldots, x_{k-n})^t$, $x_j=x(jT)$ In this embodiment, the coefficients $h_1, h_2, \ldots, h_n$, are set to ha(T), ha(2T), ..., ha(nT), respectively. Therefore, the echo component contained in the near-end voice input Sin is canceled. Such an echo replica, as mentioned above, is generated by adding a pseudo noise which is admixed with the far-end voice output Rout. Therefore, even if the component of the specific pseudo noise is admixed with the near-end voice input Sin, it can be canceled. Eventually, it can be avoided that the component of the pseudo noise is transmitted to the far-end talker. Therefore, a speech hindrance occurrable to the far-end talker by the admixture of the pseudo noise is not occurred. If a noise should be somehow transmitted to the near-end talker or far-end talker by the admixture of the pseudo noise, such a possible speech hindrance would be avoided by appropriately adjusting the level of the specific pseudo noise.

As mentioned above, according to this embodiment, the pseudo noise, whose frequency characteristic is variable in accordance with the near-end talker's voice, is forcibly supplied to the transmission line for transmitting the far-end talker's voice, and an echo path is estimated and an echo replica is generated by using the specific pseudo noise. Accordingly, a training for estimating an echo path can be carried out irrespective of the far-end talker's voice. Thus, by transfiguring the noise in accordance with the level/frequency of the near-end-voice, an appropriate echo replica can be generated while minimizing a possible deterioration of speech quality of the near-end talker.

Third Embodiment

Figure 5:
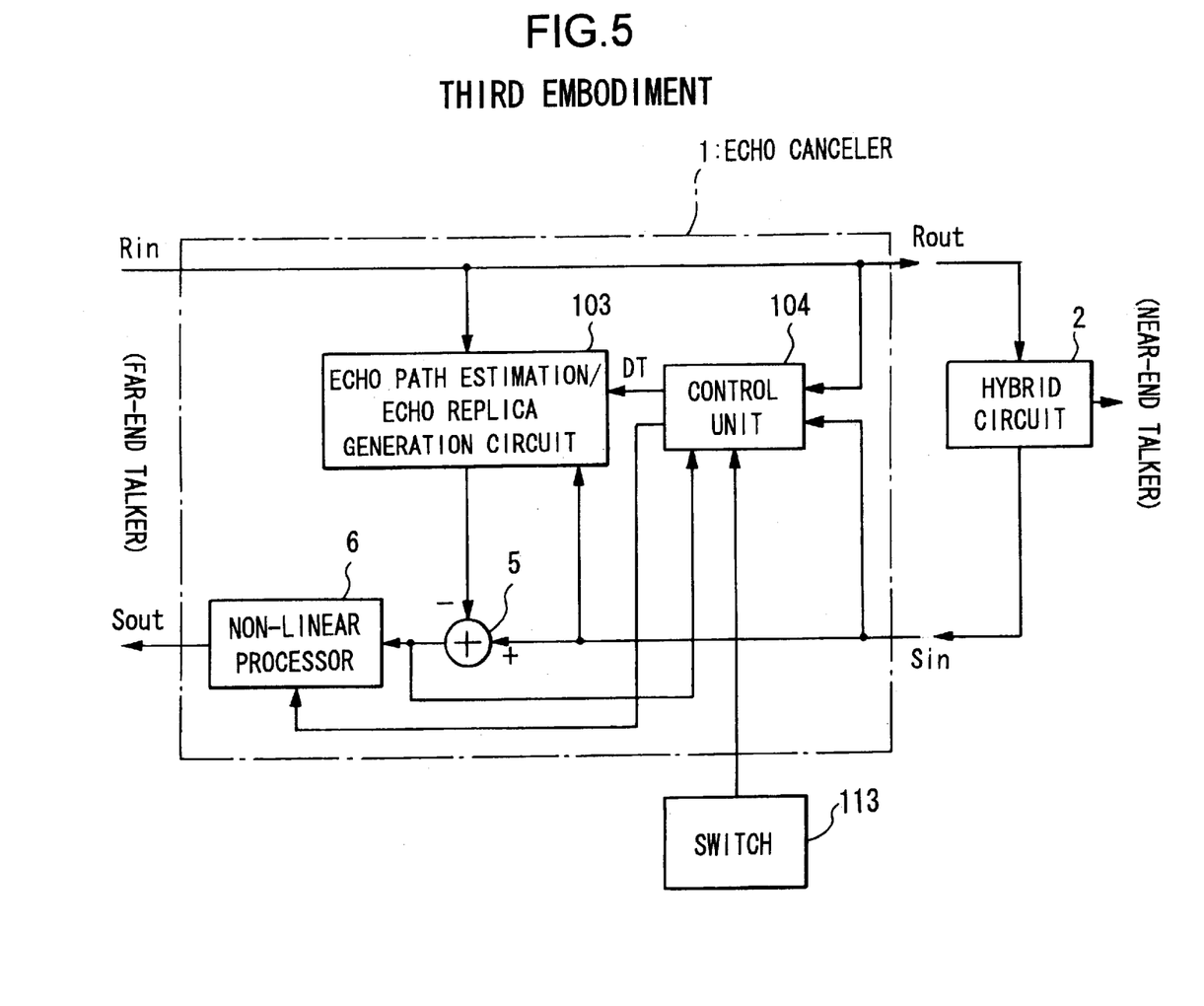
FIG. 5 is a block diagram of an echo canceler according to a third embodiment of the present invention.

FIG. 5 shows an echo canceler for practicing the third embodiment of the present invention. In FIG. 5, like component blocks of FIG. 1 are denoted by like reference numerals. An echo path estimation/pseudo echo generation circuit 103 detects a response characteristic of a hybrid circuit 2 based both on the far-end voice input Rin and a residual echo, and estimates an equivalent echo path to the hybrid circuit 2. Next, a pseudo noise like an echo generated in the hybrid circuit 2 is produced by means of a convolutional operation between a result of the estimation and the far-end voice signal Rin. A signal line for transmitting a signal indicative of a calling issued by the near-end talker and a boundary signal indicative of a setting of a calling is connected to the echo path estimation/echo replica generation circuit 103 from a switch 113. A control unit 4 makes a judgment as to whether the calling is issued from the near-end talker or from the far-end talker and pursues different procedures in accordance with a result of the judgment.

An adder 5 cancels an echo by subtracting an echo replica from the far-end voice input Sin. The control unit 104 makes a control, in addition to which of the processor 6, as to whether or not a learning of the echo path estimation/echo replica generation circuit 103 should be performed. When the far-end talker is in a speechless condition and both the far-end talker and near-end talker are simultaneously engaged in speech, the learning of the echo path estimation/echo replica generation circuit 103 is stopped because there is an unfavorable possibility of an occurrence of mislearning of the echo path estimation/echo replica generation circuit 103.

In this embodiment, a learning identification algorithm is employed as a learning method of the echo path estimation/echo replica generation circuit 103. The learning identification algorithm, when compared with other methods, is simple in algorithm and small in computational complexity and has a comparatively favorable echo canceling characteristic. The echo canceler comprises a digital circuit. A sampling time interval of the echo canceler is represented by T. Presuming that a signal propagation characteristic of the echo path is linear, if an impulse response h(j) and an input signal x(t) at time tT are used, an echo y imp(k) at time kT can be expressed by the following equations.

$$y\,\mathrm{imp}(k) = H\,\mathrm{imp}\,X(k)^t \tag{15}$$

$$H\,\mathrm{imp} = (h(1), h(2), \ldots, h(n)) \tag{16}$$

$$X(k) = (x(k-1), x(k-2), \ldots, x(k-n)) \tag{17}$$

If an estimated value of H imp at time kT is represented by H pre(k), the estimated value y pre(k) of the echo at time kT can be given by the following expression (18).

$$y\,\text{pre}(k) = H\,\text{pre}(k) X(k)^t \qquad (18)$$

A sequential corrections of H pre(k) are made in accordance with the following equations (19) and (20).

$$H\,\text{pre}(k+1) = H\,\text{pre}(k) + \alpha e(k) X(k)/X(k)X(k)^t \qquad (19)$$

(in case of $X(k)X(k)^t > n\epsilon^2$)

$$H\,\text{pre}(k+1) = H\,\text{pre}(k) \qquad (20)$$

(in case of $X(k)X(k)^t \leq n\epsilon^2$)
where $$e(k) = y(k) - y\,\text{pre}(k) \qquad (21)$$

(where y(k) is an actually measured value of Sin)
In the above equations, e(k) denotes a residual echo which is remained uncanceled at time kT. $\epsilon$ is selected to be a value of about 1/5 to 1/10 of the maximum value of x(t). An echo replica y pre(k+1) is generated at the next sampling time (k+1)T, using H pre(k+1).

In order to carry out a learning of the echo path estimation/echo replica generation circuit 103, the following conditions are required.

(1) There exists a far-end voice output Rout of the level enough to return the echo as a near-end voice input Sin. In other words, the far-end talker is in engagement of a speech.

(2) The near-end talk input Sin is constituted of an echo (only an echo and a white noise) alone. In other words, the near-end talker is not engaged in a speech.

When a new call is set, the characteristic of the echo path is greatly varied compared with a case where the talker is engaged in a speech and therefore, the residual echo e(k) is increased. For this reason, it is preferred that the learning is carried out before the far-end talker starts a speech. However, according to the conventional method, there is a fear that the echo path estimation/echo replica generation circuit 103 carries out, even if a new call is set, a learning by mistake when the far-end talker is not engaged in speech. Therefore, the learning must be stopped. Thus, according to this embodiment, in the case where a new call is set, the learning of the echo path estimation/echo replica generation circuit 103 is carried out before the far-end talker starts a speech, using a ring back tone, etc.

Figure 6:
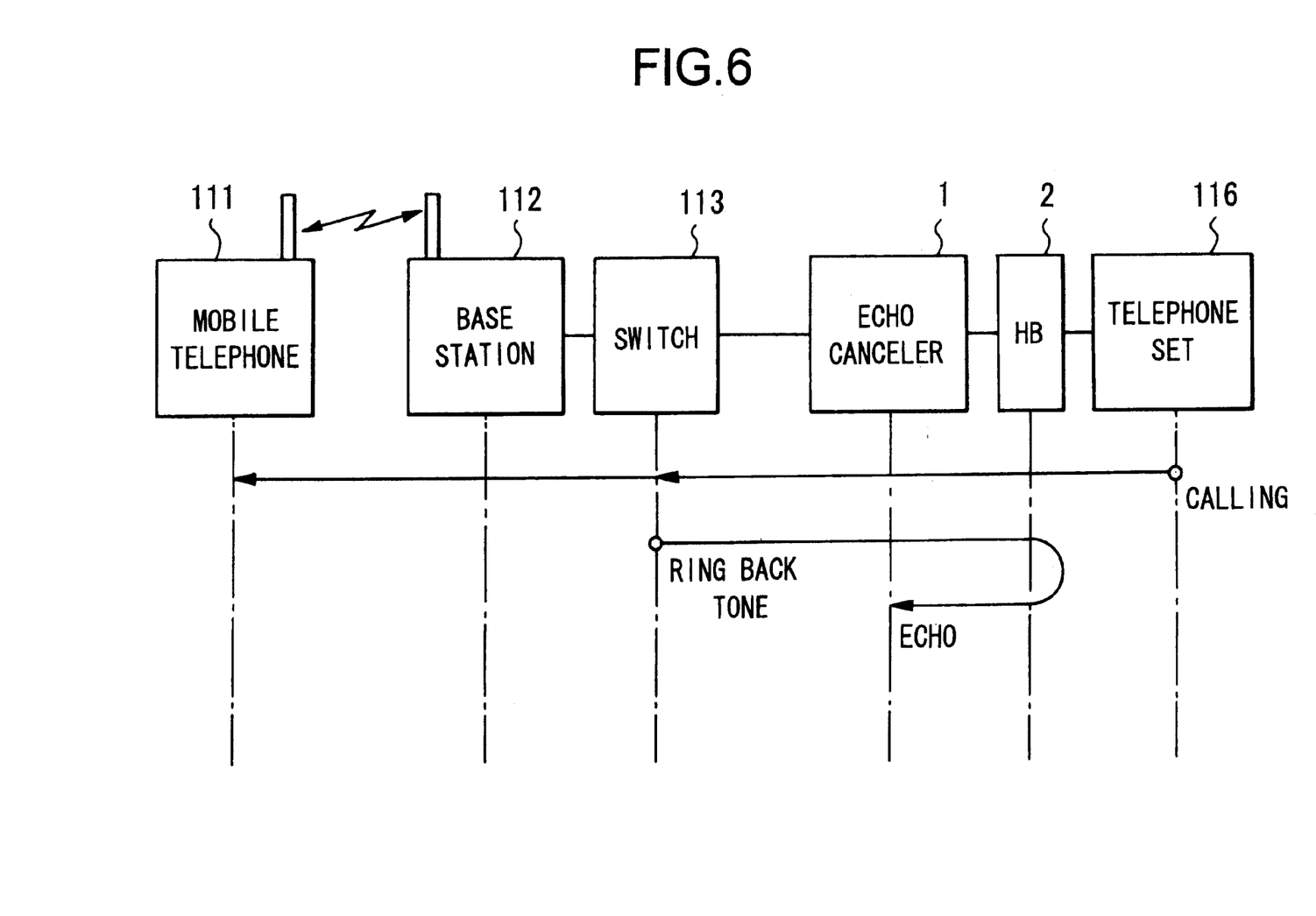
FIG. 6 is a sequence diagram showing a learning sequence when the near-end talker is making a calling.

FIG. 6 shows a communication sequence when the near-end talker makes a call. In FIG. 6, like component parts of FIG. 5 or 1 are denoted by like reference numerals. Reference numeral 111 denotes a mobile telephone on the side of the far-end talker; 112, a base station of a wireless zone to which the mobile telephone 111 belongs; 113, a switch connected with the echo canceler 1; and 116, a terrestrial telephone set on the side of the near-end talker, respectively. In the case where a calling is issued from the near-end talker's terrestrial telephone set 116, a speech loop on the side of the near-end talker is closed before the call is set and the communication line on the side of the near-end talker is connected to the echo canceler 1. A ring back tone is transmitted to the terrestrial telephone set 116 through a transmission line connected to the set 116, and an echo of the ring back tone is returned to the echo canceler 1 from the hybrid circuit 2.

A calling from the near-end talker can be recognized by the switch 113 in accordance with a known protocol. The switch 113 supplies a signal to the echo canceler 1. This signal indicates a fact that a calling is issued from the near-end talker. Then, the echo path estimation/echo replica generation circuit 103 carries out a learning using the ring back tone and its echo. Since the time required for the learning to be converged is short enough compared with the time during which a ring back tone is usually being transmitted, the learning can be finished by the time a call is set. As for a ring back tone, a suitable one for estimating an echo path may be used instead of a ring back tone of the type conventionally used.

Figure 7:
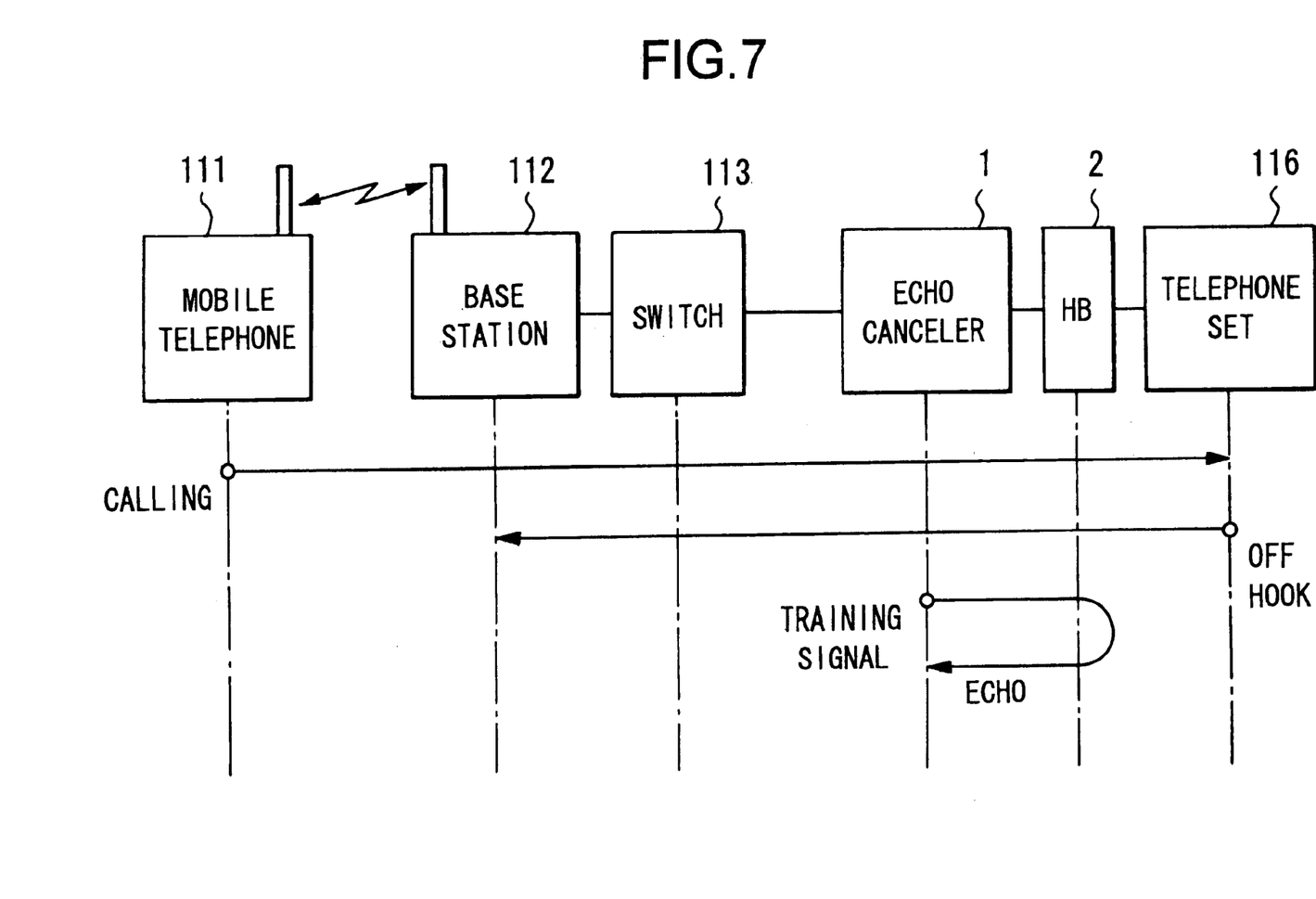
FIG. 7 is a sequence diagram showing a learning sequence when the far-end talker is making a calling.
Figure 8:
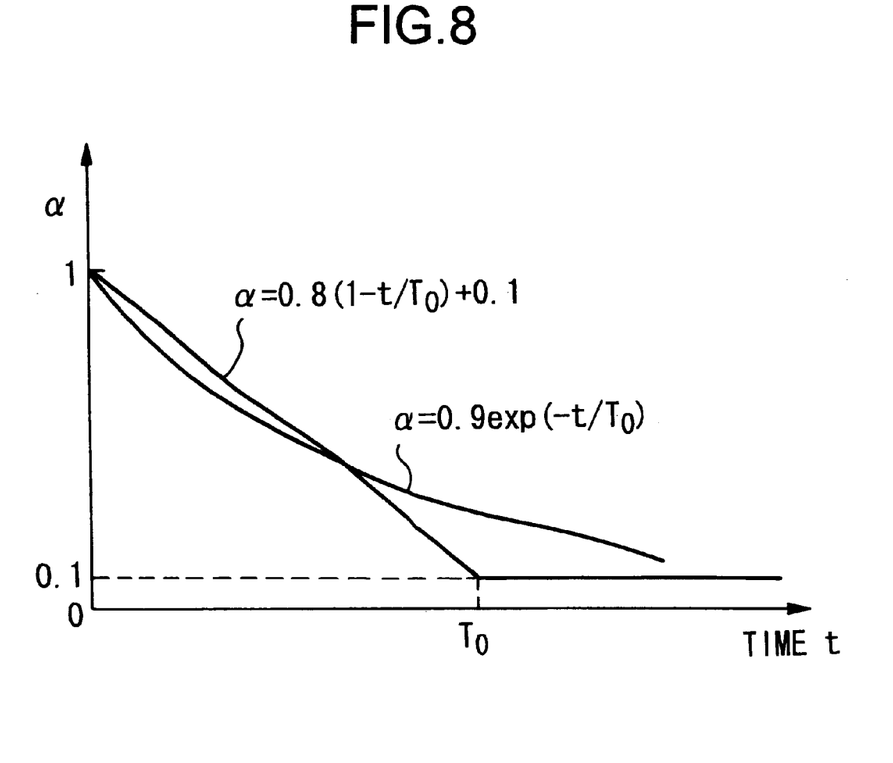

FIG. 7 shows a communication sequence in the case where a calling is issued from the movable telephone 111 on the side of the far-end talker. Since a speech loop on the side of the near-end talker is not formed at the time point a calling is issued from the far-end talker, a learning of the echo path estimation/echo replica generation circuit 103 using a calling tone cannot be carried out. When a calling has been issued, a speech loop on the side of the near-end talker is formed for the first time when a call is set by off-hook means made by the near-end talker.

A call boundary for a call to be set, namely, a call boundary, can be recognized or judged by the switch 113 with the echo canceler 1 in accordance with a call control protocol known per se. Upon detection of a call boundary in the case where a calling is issued from the side of the far-end talker, the switch 113 supplies a signal indicative of the call boundary to the echo canceler 1. Based on this call boundary signal, the echo canceler 1 transmits a training signal of a voice band to the near-end talker side. Then, an echo of the training signal is returned to the echo canceler 1 from the hybrid circuit 2. The echo path estimation/echo replica generation circuit 103 can carry out a learning of an echo path estimation path, using the training signal and an echo of the training signal.

Since the time from the call boundary to the time for the near-end talker placing the receiver on the ear is long enough compared with the time required for converging the learning of the echo estimation path, transmission of the training signal can be finished by means of converging the learning by the time the receiver is placed on the ear.

Fourth Embodiment

The speed of learning of the echo path estimation/echo replica generation circuit 103 can be increased by varying the parameter used in the learning algorithm when the characteristic of the echo path is greatly varied. In this embodiment, a parameter $\alpha$ in the learning identification algorithm used in the third embodiment is varied. So, a possible effect to the learning caused by the variation of $\alpha$ will be described first.

In case of $\alpha=1$, if the equation (19) is used, the equation can be rewritten as follows.

$$\begin{aligned} H\,\text{pre}(k+1)X(k)^t &= H\,\text{pre}(k)X(k)^t + e(k) \qquad (22)\\ &= y\,\text{pre}(k) + e(k)\\ &= y(k) \end{aligned}$$

That is, in case of $\alpha=1$, H pre(k+1) makes H pre(k+1)X(k)$^t$ equal to y(k). If an echo replica should be calculated at time kT using H pre(k+1), the echo replica would become equal to an actually measured echo and the residual echo e(k) would become zero.

Therefore, in an ideal case wherein instantaneous variations of the line characteristic, noises of the line, and a near-end talker's voice escaped from being detected, do not exist at all, $\alpha=1$ is the most desirable because a quick learning can be made. However, since there are actually those variations and noises, H pre is greatly varied due to instantaneous variations of the line characteristic and noises, if α=1. When H pre is corrected by mistake, it will happen that the echo cannot be canceled because y pre(k) becomes too small and an echo with an inverted plus and minus because y pre(k) becomes excessively large.

As an index indicative of a high cancellation capability of the echo canceler at time kT, the next ERLE(k) (echo return loss enhancement) is defined.

$$ERLE(k)=10 \log_{10}(y \text{ real}(k) \text{ electric power}/e \text{ real}(k) \text{ electric power}) \quad (23)$$

In the above equation, y real(k) and e real(k) denote quantities excluding a noise component v(k) from the echo y(k) and residual echo e(k), respectively. They are given by the following equations.

$$y \text{ real}(k)=y(k)-v(k)$$
$$e \text{ real}(k)=e(k)-v(k) \quad (24)$$

Also, an S/N ratio of a real echo y real(k) and a noise v(k) is defined by the following equation.

$$S/N(k)=10 \log_{10}(y \text{ real}(k) \text{ electric power}/v(k) \text{ electric power}) \quad (25)$$

In case of α=1, y pre(k+1) is subjected to variation of the same level with respect to a sum of the noise v(k) and the echo e real(k) in the preceding step. As a consequence, a noise of the same level with respect to the noise in the preceding step occurs to the echo replica in each step. Therefore, as the time passes after the start of learning, an average value (hereinafter simply referred to as "ERLE") of ERLE(k) in each step gradually approaches to an average value (hereinafter referred to simply as "S/N") of S/N(k). As ERLE or S/N, average values of the respective ERLE(k) and S/N(k) between 10 mS, for example, can be contemplated.

Since the variation of e real(k) in each step is, by far, smaller than the variation of the noise component v(k), the effect of the noise v(k) in the preceding step can be reduced by making α small, and ERLE can be further increased due to increased cancellation capability of the echo canceler. However, if α is reduced, an adaptation constant of H pre(k) is also reduced. Therefore, the learning speed of the echo path estimation/echo replica generation circuit 103 is lowered.

If ERLE is arranged to be smaller than N by a certain value or more, α=1 is established, and α is gradually decreased as ERLE becomes similar to or larger than S/N, the cancellation capability can be increased without greatly lowering the learning speed of the echo canceler. It should be noted, however, that since the real echo real(k) and noise component v(k) cannot be separately measured, ERLE and S/N cannot be calculated based on the actually measured value. Accordingly, α is varied as follows, using a value having a relativity with respect to ERLE.

EXAMPLE 1

When the characteristic of the echo path is varied, ERLE is reduced. Here, the variation of the characteristic of the echo path at the time when a new call is set, is, by far, larger than the variation of the characteristic of the echo path at the time when a speech is undergoing. Because the time when a call is set, that is, the call boundary can be judged based on information given by the switch 113, α is set to a value approximate to 1 within a certain time from the call boundary, and then the value of α is gradually reduced. For example, by varying α in a way as set forth below, the cancellation capability can be increased without lowering the learning speed at the time when the characteristic of the echo path is varied.

$$\alpha = 0.9 \quad (t \leq T0) \quad (T0 \text{ is a time constant}) \quad (26)$$
$$\alpha = 0.5 \quad (T0 < t \leq T1) \quad (T1 \text{ is a time constant}) \quad (27)$$
$$\alpha = 0.1 \quad (T1 < t) \quad (28)$$

When the far-end talker is in a speechless condition, and when the far-end talker and near-end talker are simultaneously engaged in speech, the learning of the echo path estimation/echo replica generation circuit 103 must be stopped because there is a fear that the echo path estimation/echo replica generation circuit 103 makes a mis-learning. Therefore, as t of the equations (26) to (28), the time after the call boundary during which only the far-end talker is engaged in speech is used. When a calling is issued from the far-end talker as in the case with the first embodiment, a training signal for learning may be transmitted by making t=0 when the near-end talker off-hooks. Further, in the case where the near-end talker makes a calling, t=0 is established when the transmission of the ring back tone is started, so that a learning may be carried out based on the ring back tone.

In the case where the near-end talker side is transferred during a speech or in other similar cases, the characteristic of the echo path is varied and ERLE becomes abruptly small. In such a case, it is necessary to increase the learning speed of α. Accordingly, α may be varied based on the equations (26) to (28) by making t=0 when ERLE becomes abruptly small and by representing the time during which only the far-end talker is engaged in speech, by t.

EXAMPLE 2

It is also possible to calculate ERLE by substituting an ordinary size of a noise component for v(k). By varying α as taught in the under-listed equations using this ERLE, for example, the cancellation capability can be increased without greatly lowering the learning speed. Here, even in the case where α is set using ERLE, it is desirable that basically, α is preliminarily set to be large at the starting time of a speech and then it is gradually reduced. That is, the smallest value among all values of α obtained in the past in accordance with the under-listed equations may be served as α which is actually used.

$$\alpha = 0.9 \quad (ERLE \leq 10 \text{ dB})$$
$$\alpha = 0.5 \quad (10 \text{ dB} < ERLE \leq 20 \text{ dB})$$
$$\alpha = 0.1 \quad (20 \text{ dB} < ERLE)$$

EXAMPLE 3

The progress of the learning can also be judged based on the average value e of the residual echo e(k). The reason why the average value is used is that the level of the residual echo in each step is a stable because it depends greatly on the level of a transmitting voice and noise. This average value e can be obtained from each residual echo e(k) between 10 mS, for example. Using the average value e of the residual echo, α can be switched as follows.

$$\alpha = 0.9 \quad (e \leq 10 \text{ dB})$$
$$\alpha = 0.5 \quad (10 \text{ dB} < e \leq 20 \text{ dB})$$
$$\alpha = 0.1 \quad (20 \text{ dB} < e)$$

EXAMPLE 4

Instead of varying α stepwise, it can also be sequentially varied with respect to time t, ERLE, or residual echo. In that case, α is expressed by the under-listed equations.

EXAMPLE 4-1

If time t is served as a parameter, α can be expressed as follows, using a time constant T0.

$$\alpha = 0.8 \, (1 - t/T0) + 0.1 \quad (t < T0)$$
$$\alpha = 0.1 \quad\quad\quad\quad\quad\quad (T0 \leq t)$$
$$\text{or} \quad \alpha = 0.9 \exp(-t/T0)$$

EXAMPLE 4-2

If ERLE is served as a parameter, α can be expressed as follows, using a constant E0.

$$\alpha = 0.8 \, (1 - ERLE/E0) + 0.1 \quad (ERLE < T0)$$
$$\alpha = 0.1 \quad\quad\quad\quad\quad\quad (T0 \leq ERLE)$$
$$\text{or} \quad \alpha = 0.9 \exp(-ERLE/E0)$$

EXAMPLE 4-3

If the residual echo e is served as a parameter, α can be expressed as follows, using a constant A0.

$$\alpha = 0.8 \, (1 - e/A0) + 0.1 \quad (e < A0)$$
$$\alpha = 0.1 \quad\quad\quad\quad\quad\quad (A0 \leq e)$$
$$\text{or} \quad \alpha = 0.9 \exp(-e/A0)$$

EXAMPLE 5

The method for transmitting a training signal may be employed in any of the example 2 to example 4. In the case where the far-end talker makes a calling, the training signal is transmitted when the near-end talker off-hooks, as in the case with the embodiment 3. In the case where the near-end talker makes a calling, a ring back tone or its echo may be used for carrying out the learning.

In this embodiment, α is varied as a parameter of a learning algorithm. However, other parameters having a certain effect on the learning speed may be employed so that they are varied, taking advantage of the fact that a quick learning is requested immediately after the call boundary and thereafter, an accurate learning (namely, learning with no mistake) is requested. Also in the case where other learning algorithms than the learning identification algorithm are employed, parameters used in those algorithms can be varied in the same manner as in this embodiment.

Fifth Embodiment

With respect to a learning algorithm of the echo canceler, other algorithms than the learning identification algorithm such as, for example, RLS (Recursive Least Square) may be used. Since the algorithm of RLS is known, description thereof is omitted. While RLS has such an advantage that its converging speed is fast compared with the learning identification algorithm, it has the disadvantage in that its computational complexity is large because an inverse matrix computation is necessary for it. Therefore, the RLS algorithm is used at the start of a speech where a rapid estimation of the echo path is required, and the algorithm is switched to the learning identification algorithm at a time point the estimation has progressed to some extent. Owing to this arrangement, the echo path can be rapidly estimated while restraining the increase of computational complexity required for an overall switch.

Since a computational capability of a general-purpose DSP currently available satisfies computational capability required for learning identification algorithm <computational capability of DSP<computational capability required for RLS, a calculation is carried out in accordance with RLS, using a high speed DSP or a plurality of DSP with respect to an initial input after the start of a speech. Then, the algorithm is switched to the learning identification algorithm in the midway of the calculation procedure, using the obtained learning result. By doing this, the echo path can be rapidly estimated while making efficient use of a resource by the entire switch.

The learning algorithm can be switched, for example, in accordance with the under-listed methods, using time t, ERLE, or echo level e as in the case with the switching of α.

| (1) | RLS | (t < T0) |
| | Learning identification algorithm | (T0 ≤ t) |
| (2) | RLS | (e < A0) |
| | Learning identification algorithm | (A0 ≤ e) |
| (3) | RLS | (ERLE < 10dB) |
| | Learning identification algorithm | (10dB ≤ ERLE) |

It is also acceptable that after the algorithm is switched to the learning identification algorithm, the value of α is varied using the method as described in the fourth embodiment. In the case where a calling is made by the far-end talker, a training signal may be transmitted for learning at the time when the near-end talker off-hooks, as in the case with the first embodiment. Similarly, in the case where the near-end talker makes a calling, the learning can be made using a ring back tone.

Sixth Embodiment

Because the noise component v(k) is admixed to the echo in the method described in the fourth or fifth embodiment, a correct estimation is impossible to make as to how far the learning of the echo canceler has been progressed. In order to measure an approximate value to a real echo real(k), there can be contemplated a method in which a vocal spectrum of x(k) is analyzed and the level of the echo y(k) is measured with respect to the obtained spectrum component. Also, in the case where the echo level is not uniform with respect to the vocal frequency, it is necessary to analyze the echo spectrum of x(k) and y(k).

The method for analyzing a vocal spectrum can be roughly classified into two; one is a non-parametric analysis (NPA) and the other is a parametric analysis (PA).

Examples of the non-metric analysis include (1) a short term auto-correlation analysis, (2) a short term spectrum analysis, (3) a cepstrum analysis, and (4) a zero crossing analysis. On the other hand, examples of the parametric analysis include (1) an analysis by synthesis (A-b-S method), (2) a linear prediction analysis (LPC), (3) a maximum likelihood spectrum estimation (an auto-correlation method and an inverse filter method), (4) a non-dispersing method, (5) a PARCOR analysis, and (6) an LSP analysis.

The spectrum analysis method to be used can be switched in the same manner as the learning algorithm being switched in the second embodiment, using time t, ERLE, or echo level e.

Modified Embodiment

It should be noted that the present invention is not limited to the above-mentioned embodiments. For example, many changes and modifications can be made as follows.

① In any of the above-mentioned embodiments, the present invention is applied to a signal transmission between a mobile telephone and a terrestrial telephone. However, application of the present invention is not limited to this. The present invention can be applied to all communication networks in which a signal transmission is made between a two-wire circuit and a four-wire circuit.

② In the first and second embodiments, the pseudo noise generator 11 normally generates a pseudo noise. However, an arrangement may also be made, in which, as in the case with the third embodiment, a call boundary is received from the switch and no pseudo signal is generated until after the passage of a certain time. Owing to this arrangement, the learning can be finished by the time the near-end talker brings the receiver very close to the ear, so that a pseudo noise can be prevented from being transmitted to the near-end talker at the time a speech is actually made.

③ The pseudo noise generator 11 may generate a pseudo noise when the far-end talker remains in a speechless condition for more than a predetermined time. The reason is that when the far-end talker side is in a speechless condition, transmission of a noise, if any, to the near-end talker side cannot be any hindrance to the speech.

④ The pseudo noise generator 11 may generate a pseudo noise when a cancellation of echo has gone below a predetermined level in the adder 17. The reason is that there is a high possibility of no generation of normal echo replica in the echo replica generator 16 and a re-learning seems to be desirable.

⑤ The level of a pseudo noise is constant in the first embodiment. However, the level of a pseudo noise may be decreased as the time required for carrying out the correlation operation is increased.

We claim:

1. An echo canceler learning method applicable to an echo canceler employed in a communication line network including a hybrid circuit for converting signals between a four-wire trunk and a two-wire loop, said four-wire trunk comprising a first transmission line for transmitting a signal through the hybrid circuit to said two-wire loop and a second transmission line for transmitting a signal coming from said two-wire loop through the hybrid circuit, said echo canceler learning method comprising the steps of:

generating a pilot signal and supplying the pilot signal on said first transmission line;

calculating a coefficient necessary for generating an echo replica based on a correlation established between the pilot signal supplied on said first transmission line and the signal on said second transmission line;

judging whether a calling is issued from said four-wire trunk or said two-wire loop;

effecting the learning of said echo canceler using a first learning method when it is judged that the calling is issued from said four-wire trunk; and effecting the learning of said echo canceler using a second learning method when it is judged that the calling is issued from said two-wire loop.

2. An echo canceler employed in a communication line network including a hybrid circuit for converting signals between a four-wire trunk and a two-wire loop, said four-wire trunk comprising a first transmission line for transmitting a signal through the hybrid circuit to said two-wire loop and a second transmission line for transmitting a signal coming from said two-wire loop through the hybrid circuit, said echo canceler comprising:

a pseudo noise generator for generating a pseudo noise;

a filter having variable filter characteristics for configuring the pseudo noise to have desired signal characteristics and outputting the configured pseudo noise on said first transmission line; and a detector for detecting level and frequency characteristics of the signal on said second transmission line and varying the filter characteristics of said filter in accordance with the detected level and frequency characteristics of the signal;

wherein a coefficient necessary for generating an echo replica is calculated based on a correlation established between the pseudo noise outputted on said first transmission line through said filter and the signal on said second transmission line.

3. An echo canceler according to claim 2, further comprising means for calculating a coefficient necessary for generating an echo replica based on a correlation established between the pseudo noise outputted on said first transmission line through said filter and the signal on said second transmission line.

4. An echo canceler learning method for carrying out a learning for enhancing an echo cancellation capability of an echo canceler adapted to cancel an echo occurring in a communication line in real time during a communication, said echo canceler learning method comprising the steps of:

detecting that a call through said communication line has been set; and setting a learning parameter utilized for learning an echo path in the communication line in accordance with changes in a learning condition occurring after it is detected that said call has been set.

5. An echo canceler learning method according to claim 4, wherein said learning condition is a level parameter indicative of a level of a residual echo which remains uncanceled.

6. An echo canceler learning method according to claim 5, wherein said learning condition is a lapse of time after said level parameter is abruptly increased.

7. An echo canceler learning method according to claim 4, wherein said learning condition is a lapse of time.

8. An echo canceler learning method for carrying out a learning for enhancing an echo cancellation capability of an echo canceler adapted to cancel an echo occurring in a communication line in real time during a communication, said echo canceler learning method comprising the steps of:

detecting that a call through said communication line has been set; and switching learning algorithms utilized for learning an echo path in the communication line changes in a learning condition occurring after it is detected that said call has been set.

9. An echo canceler learning method according to claim 8, wherein said learning condition is a lapse of time.

10. An echo canceler learning method according to claim 8, wherein said learning condition is a level parameter indicative of a level of a residual echo which remains uncanceled.

11. An echo canceler learning method according to claim 10, wherein said learning condition is a lapse of time after said level parameter is abruptly increased.

12. An echo canceler learning method for carrying out a learning for enhancing an echo cancellation capability of an echo canceler adapted to cancel an echo occurring in a communication line in real time during a communication, said echo canceler comprising call boundary information input means for inputting call boundary information from a switch, said echo canceler learning method comprising the steps of:

revising a parameter used for said learning method to increase the speed of said learning method, when the call boundary information from said switch is inputted by said call boundary information input means; and     after the passage of a predetermined time thereafter, revising the parameter used for said learning method to increase the accuracy of said learning method.

13. An echo canceler learning method for carrying out a learning for enhancing an echo cancellation capability of an echo canceler adapted to cancel an echo occurring in a communication line which is connected to a mobile telephone and to a terrestrial telephone, said echo canceler learning method comprising the steps of:

judging whether a calling is issued from said mobile telephone or from said terrestrial telephone based on information given to said echo canceler from a switch which is connected with said echo canceler;

effecting the learning of said echo canceler using a first learning method when it is judged that the calling is issued from said mobile telephone; and     effecting the learning of said echo canceler using a second learning method when it is judged that the calling is issued from said terrestrial telephone.

14. An echo canceler learning method for carrying out a learning for enhancing an echo cancellation capability of an echo canceler adapted to cancel an echo occurring in a communication line which is connected to a mobile telephone and to a terrestrial telephone, said echo canceler learning method comprising the steps of:

judging whether a calling is issued from said terrestrial telephone or from said mobile telephone based on a signal given from a switch connected with said echo canceler;

effecting said learning using a ring back tone transmitted back to said terrestrial telephone and an echo of said ring back tone when it is judged that the calling is issued from said terrestrial telephone; and     effecting said learning using a predetermined training signal transmitted back to said terrestrial telephone and an echo of said training signal when it is judged that the calling is issued from said mobile telephone.

15. An echo canceler learning method according to claim 14, further comprising the steps of:

setting a parameter used for said learning method to increase the speed of said learning method when it is judged that the calling is issued from either said terrestrial telephone or said mobile telephone; and     after a lapse of predetermined time from the setting of the parameter, revising the parameter used for said learning to increase the accuracy of said learning.

16. An echo canceler learning method applicable to an echo canceler employed in a communication line network including a hybrid circuit for converting signals between a four-wire trunk and a two-wire loop, said four-wire trunk comprising a first transmission line for transmitting a signal through the hybrid circuit to said two-wire loop and a second transmission line for transmitting a signal coming from said two-wire loop through the hybrid circuit, said echo canceler learning method comprising the steps of:

detecting a calling issued from said two-wire loop;

detecting a ring back tone transmitted back from said four-wire trunk;

calculating a coefficient necessary for generating an echo replica based on a correlation established between said ring back tone and the signal on said second transmission line; and     canceling an echo based on said echo replica.

* * * * *

UNITED STATES PATENT AND TRADEMARK OFFICE
CERTIFICATE OF CORRECTION

PATENT NO.   : 6,061,444
DATED        : May 9, 2000
INVENTOR(S)  : Toshiro Kawahara et al.

It is certified that error appears in the above-identified patent and that said Letters Patent is hereby corrected as shown below:

On the Title Page

Column 2, after line 1, insert :
--5,638,311      6/1997      Fujii et al.      364/724.19--.

Signed and Sealed this

Tenth Day of July, 2001

Attest:

NICHOLAS P. GODICI
Attesting Officer    Acting Director of the United States Patent and Trademark Office